(12) United States Patent
Könitz

(10) Patent No.: US 11,002,253 B2
(45) Date of Patent: May 11, 2021

(54) WIND TURBINE AND COOLING DEVICE FOR A WIND TURBINE

(71) Applicant: Wobben Properties GmbH, Aurich (DE)

(72) Inventor: Malte Könitz, Oldenburg (DE)

(73) Assignee: Wobben Properties GmbH, Aurich (DE)

( * ) Notice: Subject to any disclaimer, the term of this patent is extended or adjusted under 35 U.S.C. 154(b) by 366 days.

(21) Appl. No.: 16/066,273

(22) PCT Filed: Dec. 23, 2016

(86) PCT No.: PCT/EP2016/082559
§ 371 (c)(1),
(2) Date: Jun. 26, 2018

(87) PCT Pub. No.: WO2017/114787
PCT Pub. Date: Jul. 6, 2017

(65) Prior Publication Data
US 2020/0284243 A1    Sep. 10, 2020

(30) Foreign Application Priority Data
Dec. 28, 2015  (DE) ........................ 10 2015 122 855

(51) Int. Cl.
*F03D 80/60*  (2016.01)
*F03D 13/20*  (2016.01)
(Continued)

(52) U.S. Cl.
CPC ............. *F03D 80/60* (2016.05); *F03D 13/20* (2016.05); *H02B 1/56* (2013.01); *F03D 80/82* (2016.05); *F03D 80/85* (2016.05); *H02B 13/025* (2013.01)

(58) Field of Classification Search
CPC .......... F03D 13/20; F03D 80/60; F03D 80/00; F03D 80/82; F03D 80/85; H02B 1/56; H02B 13/025
See application file for complete search history.

(56) References Cited

U.S. PATENT DOCUMENTS 5,689,097 A * 11/1997 Aufermann ............ H02B 1/565
218/157
6,407,331 B1 * 6/2002 Smith .................. H02B 13/025
174/17 VA
(Continued)

FOREIGN PATENT DOCUMENTS

DE    102010007136 A1    8/2011
DE    102012221498 A1    5/2014
(Continued)

*Primary Examiner* — Brian P Wolcott
*Assistant Examiner* — Behnoush Haghighian
(74) *Attorney, Agent, or Firm* — Seed IP Law Group LLP

(57) ABSTRACT

A wind turbine is provided having a foundation, a tower with a tower wall, at least one component to be cooled within the tower wall, a first cooling unit within the tower wall for cooling the components to be cooled, a second cooling unit, which is provided at least partially outside the tower wall, and a medium-voltage switchgear assembly within the tower wall. The wind turbine further has at least one fault arc duct between the medium-voltage switchgear assembly and the second cooling unit. At least one cooling duct or a cooling line between the first and second cooling unit is also provided. The second cooling unit has a heat exchanger which is coupled to the cooling duct or the cooling line, and a pressure-release unit which serves to guide a pressure wave formed inside the medium-voltage switchgear assembly and transmitted via the fault arc duct to the outside.

12 Claims, 4 Drawing Sheets

(51) Int. Cl.
*H02B 1/56* (2006.01)
*F03D 80/80* (2016.01)
*H02B 13/025* (2006.01)

(56) References Cited

U.S. PATENT DOCUMENTS

| | | | | |
|---|---|---|---|---|
| 7,054,143 B2* | 5/2006 | Eiselt | ............... | H02B 13/025 218/155 |
| 7,168,251 B1* | 1/2007 | Janssen | ............... | F03D 80/60 60/641.1 |
| 7,748,946 B2* | 7/2010 | Wan | ............... | F03D 13/20 415/1 |
| 7,821,774 B2* | 10/2010 | Josten | ............... | H02B 13/025 361/605 |
| 7,837,126 B2* | 11/2010 | Gao | ............... | F03D 13/20 236/44 C |
| 7,905,104 B2* | 3/2011 | Matesanz Gil | ............... | F03D 80/60 62/259.1 |
| 7,955,045 B2* | 6/2011 | de Place Rimmen | ............... | F03D 9/25 415/1 |
| 8,058,742 B2* | 11/2011 | Erdman | ............... | F03D 9/25 290/55 |
| 8,242,395 B2* | 8/2012 | Josten | ............... | H02B 13/025 200/306 |
| 8,247,915 B2* | 8/2012 | Crane | ............... | F04B 17/02 290/44 |
| 8,416,042 B2* | 4/2013 | Schwaiger | ............... | H01F 27/085 336/60 |
| 8,601,804 B2* | 12/2013 | Akashi | ............... | F03D 80/60 60/398 |
| 8,632,303 B2* | 1/2014 | Akashi | ............... | F03D 80/60 415/176 |
| 8,684,682 B2* | 4/2014 | Akashi | ............... | F03D 13/10 415/178 |
| 8,733,855 B2* | 5/2014 | Josten | ............... | H02B 13/025 312/223.1 |
| 8,785,770 B2* | 7/2014 | Gingrich | ............... | H02B 1/565 174/17 VA |
| 9,175,491 B2* | 11/2015 | Gawrisch | ............... | F03D 80/60 |
| 9,297,362 B2* | 3/2016 | Becker | ............... | F03D 13/20 |
| 9,458,736 B2* | 10/2016 | Yanagibashi | ............... | F01D 25/12 |
| 9,624,908 B2* | 4/2017 | Airoldi | ............... | H02K 7/1838 |
| 9,627,865 B2 | 4/2017 | van Dyk et al. | | |
| 10,077,760 B2* | 9/2018 | Tschirch | ............... | F03D 80/60 |
| 2004/0114289 A1* | 6/2004 | Eiselt | ............... | H02B 13/025 361/62 |
| 2009/0200273 A1* | 8/2009 | Josten | ............... | H02B 13/025 218/157 |
| 2012/0119505 A1* | 5/2012 | Hayashi | ............... | H01F 27/025 290/55 |
| 2012/0133152 A1* | 5/2012 | Wagoner | ............... | F03D 80/60 290/1 B |
| 2013/0026139 A1* | 1/2013 | Becker | ............... | F03D 13/25 218/157 |
| 2013/0026764 A1* | 1/2013 | Hayashi | ............... | H01F 27/025 290/55 |
| 2014/0353977 A1* | 12/2014 | Soerensen | ............... | F03D 80/00 290/55 |
| 2016/0102493 A1 | 4/2016 | Pollmann et al. | | |

FOREIGN PATENT DOCUMENTS

| | | | | |
|---|---|---|---|---|
| EP | 2672114 A1 | 12/2013 | | |
| EP | 2743502 A1 * | 6/2014 | ............... | F03D 9/28 |
| EP | 2803855 A1 * | 11/2014 | ............... | H02K 9/19 |
| JP | 2011530185 A | 12/2011 | | |
| JP | 2016516943 A | 6/2016 | | |
| WO | 2009056156 A2 | 5/2009 | | |
| WO | 2012105032 A1 | 8/2012 | | |
| WO | 2013021670 A1 | 2/2013 | | |

\* cited by examiner

WIND TURBINE AND COOLING DEVICE FOR A WIND TURBINE

BACKGROUND

Technical Field

The present invention relates to a wind turbine and a cooling device for a wind turbine.

Description of the Related Art

Each wind turbine has a multiplicity of components which generate heat during operation. These components must be cooled under specific conditions such as, for example, a high external temperature, long operation at nominal power, etc. Such components to be cooled are, for example, a generator, inverter, rectifier, transformers, medium-voltage switchgear assemblies, etc.

In the priority-substantiating German Patent Application the following documents were mentioned by the German Patent and Trademark Office: DE 10 2010 007 136 A1 and WO 2009/056156 A2.

BRIEF SUMMARY

A wind turbine and a cooling device for a wind turbine which enables effective cooling of the wind turbine are provided.

Thus, a wind turbine is provided having a foundation, a tower with a tower wall, at least one component to be cooled within the tower wall, a first cooling unit within the tower wall for cooling the components to be cooled, a second cooling unit, which is provided at least partially outside the tower wall, and a medium-voltage switchgear assembly within the tower wall. The wind turbine further has at least one fault arc duct between the medium-voltage switchgear assembly and the second cooling unit. Furthermore, a cooling duct or a cooling line between the first and second cooling unit is also provided. The second cooling unit has a heat exchanger which is coupled to the cooling duct or the cooling line. The second cooling unit further has a pressure-release unit which serves to guide a pressure wave formed inside the medium-voltage switchgear assembly and transmitted via the fault arc duct to the outside. The second cooling unit has a first end and a second end, wherein the first end is provided outside the tower wall and the second end is provided at least partially inside the tower wall. Thus, the cooling unit can be securely fastened to the tower wall.

According to one aspect of the present invention, the fault arc duct opens into a separate volume inside the second cooling unit which is connected to the pressure-release unit. Thus a pressure wave can be safely led off through the fault arc duct, the separate volume and the pressure-release unit without any damage being caused to the second cooling unit.

According to one aspect of the present invention, the second cooling unit has at least one burglar-proof protective grid. The heat exchanger is provided at least partially behind the protective grid inside the second cooling unit.

According to a further aspect of the present invention, a cooling liquid is provided inside the cooling duct.

The invention also relates to a cooling device for a wind turbine. The cooling device has a first cooling unit, which can be placed inside a tower wall of a tower of a wind turbine. The cooling device has a second cooling unit, which can be placed at least partially outside a tower wall of a tower of a wind turbine. The second cooling unit comprises a heat exchanger which is coupled to the first cooling unit via a cooling duct or a cooling line. The second cooling unit has a connection for a fault arc duct, a separate volume and a pressure-release unit. The connection for the fault arc duct is coupled to the separate volume.

The invention relates to providing a wind turbine with a cooling device which can cool the components of the wind turbine. To this end, the wind turbine can have at least one cooling unit which for example can be configured as a fan shroud and which is placed partially outside the tower wall. A re-cooler or a heat exchanger is provided in the cooling unit which is coupled to the cooling device and cools a cooling fluid which has been heated by the components of the wind turbine to be cooled. Thus, at least one cooling line is provided between the cooled unit placed at least partially or sectionally outside the tower wall and the interior of the tower wall. The wind turbine also has a medium-voltage switchgear unit or medium-voltage switchgear assembly which is also coupled to the cooling unit via a fault arc duct, wherein the cooling device has a pressure-release device (pressure-release valve) which can guide a hot pressure wave formed as a result of a fault arc from the medium-voltage switchgear unit or the medium-voltage switchgear assembly (i.e., from the interior of the tower of the wind turbine) towards the outside.

The cooling unit can be placed at least partially in an opening in the tower wall (i.e., for example a first end can be introduced into an opening of the tower wall). A second end of the cooling unit is therefore provided outside the tower wall. The cooling unit comprises a re-cooling unit or a heat exchanger which is coupled to a cooling duct or a cooling line which couples components of the wind turbine to be cooled to the heat exchanger inside the cooling unit. Furthermore, the cooling unit has a pressure-release unit by means of which a pressure wave produced for example in a medium-voltage switchgear unit or the medium-voltage switchgear assembly can be guided out from the tower of the wind turbine.

According to one aspect of the invention, protection from burglary can be provided by a series circuit of at least two burglar-proof grids. An external grid can optionally be used as a weather protection grid. Rain or precipitation can thus be prevented from entering the cooling unit.

BRIEF DESCRIPTION OF THE SEVERAL VIEWS OF THE DRAWINGS

Advantages and exemplary embodiments of the invention will be explained in detail hereinafter with reference to the drawings.

DETAILED DESCRIPTION

Figure 1:
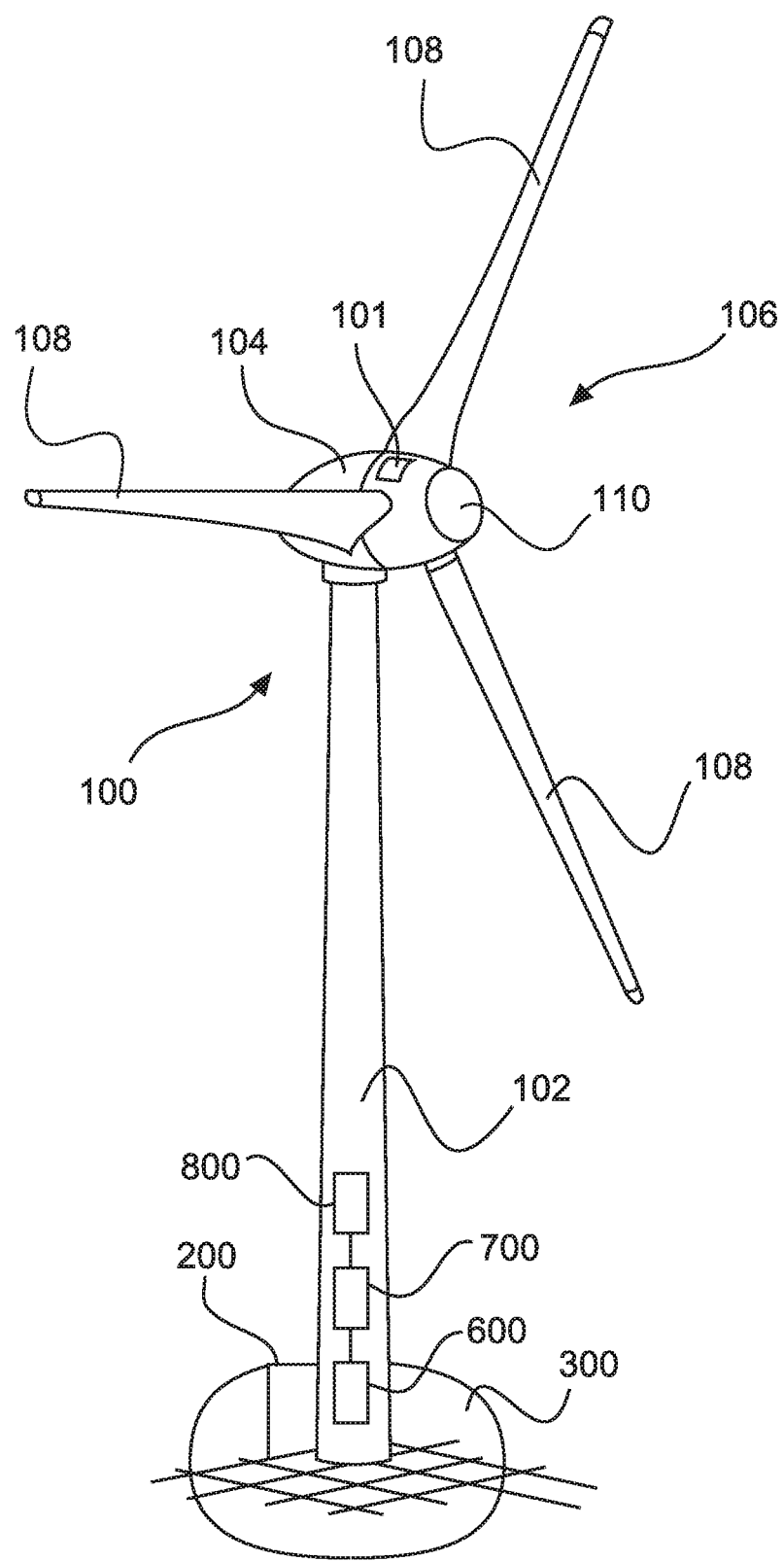
FIG. 1 shows a schematic diagram of a wind turbine according to a first exemplary embodiment.

FIG. 1 shows a schematic diagram of a wind turbine according to a first exemplary embodiment. The wind turbine 100 has a tower 102 and a nacelle 104 on the tower 102. An aerodynamic rotor 106 with three rotor blades 108 and a spinner 110 is provided on the nacelle 104. The aerodynamic rotor 106 is set in a rotary movement by the wind during operation of the wind turbine and thereby also rotates a rotor of a generator 101 which is directly or indirectly coupled to the aerodynamic rotor 106. The electric generator 101 can be arranged in the nacelle and generates electrical energy. The pitch angle of the rotor blades 108 can be adjusted.

The tower 102 of the wind turbine is placed on a foundation 300. Inside the wind turbine, in particular inside the tower 102, a medium-voltage switchgear assembly 600 and components 800 to be cooled can be provided. The components 800 to be cooled can be a rectifier, an inverter, a transformer or the like. The components 800 to be cooled can be coupled to a first cooling unit 700. The first cooling unit 200 can be provided at least outside the tower 102. The first and second cooling unit 700, 200 can be coupled to one another, for example, via cooling ducts or cooling lines in which a cooling fluid flows and can form a cooling device. The cooling fluid absorbs heat, for example, from the components 800 to be cooled and delivers it to the external air by means of a second cooling unit 200.

Figure 2:
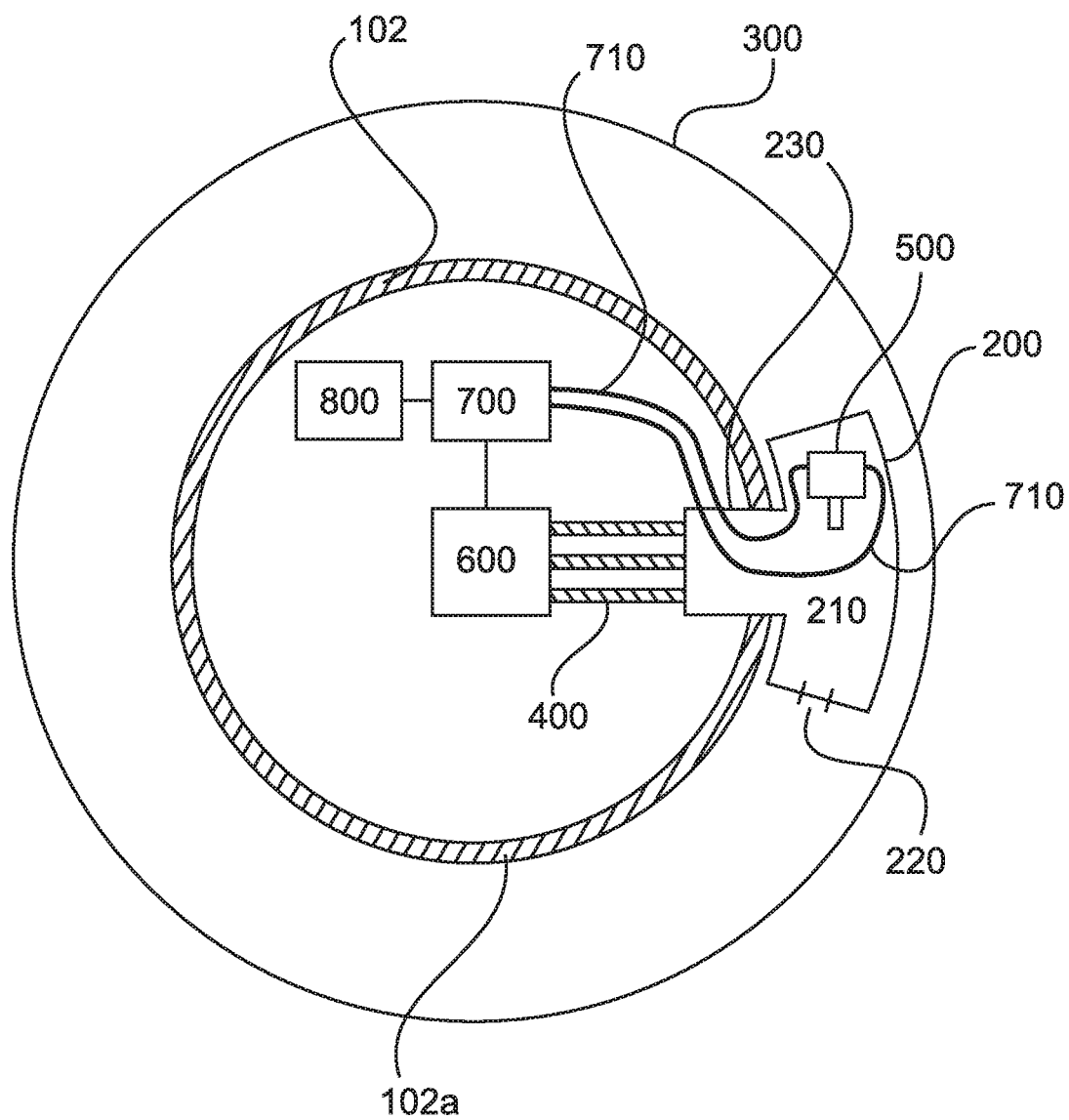
FIG. 2 shows a schematic sectional view of a wind turbine according to a first exemplary embodiment.

FIG. 2 shows a schematic sectional view of a wind turbine according to the first exemplary embodiment. The wind turbine 100 has a tower 102 which is placed on a foundation 300. The tower 102 has a tower wall 102a. Components 800 to be cooled, a first cooling unit 700 and for example a medium-voltage switchgear unit or medium-voltage switchgear assembly 600 can be provided inside the tower wall 102a. A second cooling component 200 is provided at least partially outside the tower wall 102a. The second cooling unit 200 comprises a heat exchanger 500 which is coupled by means of a cooling duct or cooling lines 710 to the first cooling unit 700 which is coupled to the components 800 to be cooled in order to remove the heat generated by the components 800 to be cooled.

The wind turbine according to the first exemplary embodiment has a medium-voltage switchgear unit or medium-voltage switchgear assembly 600 which is also coupled to the second cooling unit 200 via a fault arc duct 400. The second cooling unit 200 has a pressure-release unit 220 which is coupled to the fault arc ducts 400 and which is suitable to guide a pressure wave generated inside the medium-voltage switchgear assembly 600, which is guided via the fault arc duct 400 into the second cooling unit 200, to the outside.

The second cooling unit thus fulfils two functions, namely on the one hand the function as heat exchanger for the cooling medium and as pressure-release unit for the medium-voltage switchgear assembly.

According to the first exemplary embodiment, a first end 210 of the second cooling unit is provided outside the tower wall 102 and a second end 230 is provided in or inside the tower wall 102a.

Figure 3:
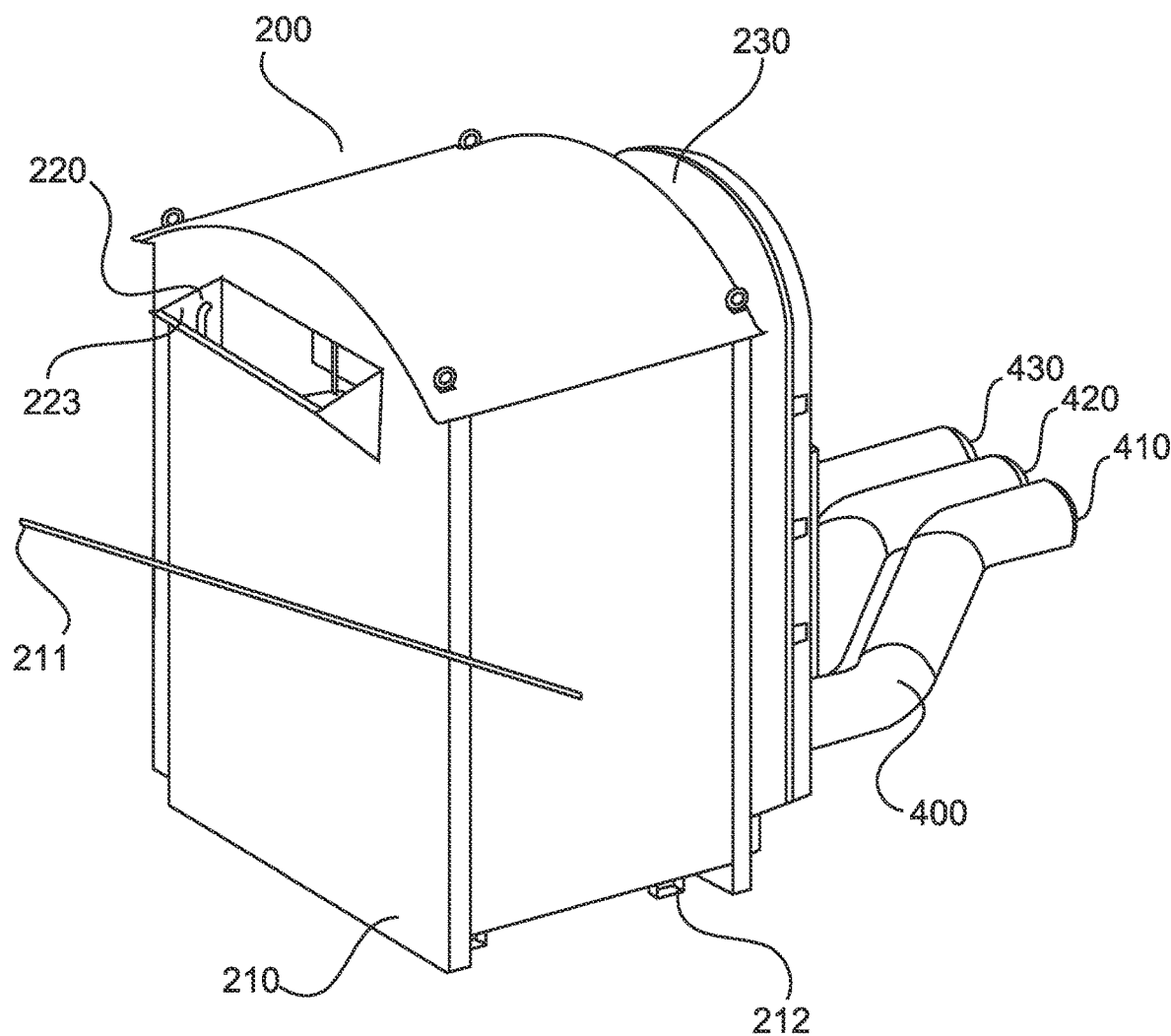
FIG. 3 shows a schematic diagram of a cooling unit according to a second exemplary embodiment and FIG. 4 shows a schematic view of a cooling unit according to a second exemplary embodiment.

FIG. 3 shows a schematic diagram of a cooling unit according to a second exemplary embodiment. The cooling unit according to the second exemplary embodiment can correspond to the second cooling unit according to the first exemplary embodiment. The second cooling unit 200 has a first section 210 and a second section 230. The first section or the first end 210 is located in the installed state outside the tower wall 102a whilst the second section or the second end 230 is located inside the tower wall 102a. A connection of the second cooling unit to the tower of the wind turbine is thus made via the second section or the second end 230. The second cooling unit 200 is connected via a fault arc duct 400 to a medium-voltage switchgear unit or medium-voltage switchgear assembly 600 for example inside the tower wall 102a. The fault arc duct 400 can for example consist of three pipes 410, 420, 430.

A pressure-release unit 220 is provided at the first end 210. The pressure-release unit 220 can have an opening limiter 223 and a spring which holds the valve closed in the normal state. The first end 110 can have at least one protective grid 111 which is configured as a burglar-proof protective grid. A heat exchanger or a re-cooler 500 is placed behind the protective grid 211. The second cooling unit 200 has legs 212 which, for example, are placed in the foundation 300 of the wind turbine. Thus, the second cooling unit which, for example, is configured as a fan shroud is placed on the foundation of the wind turbine.

Figure 4:
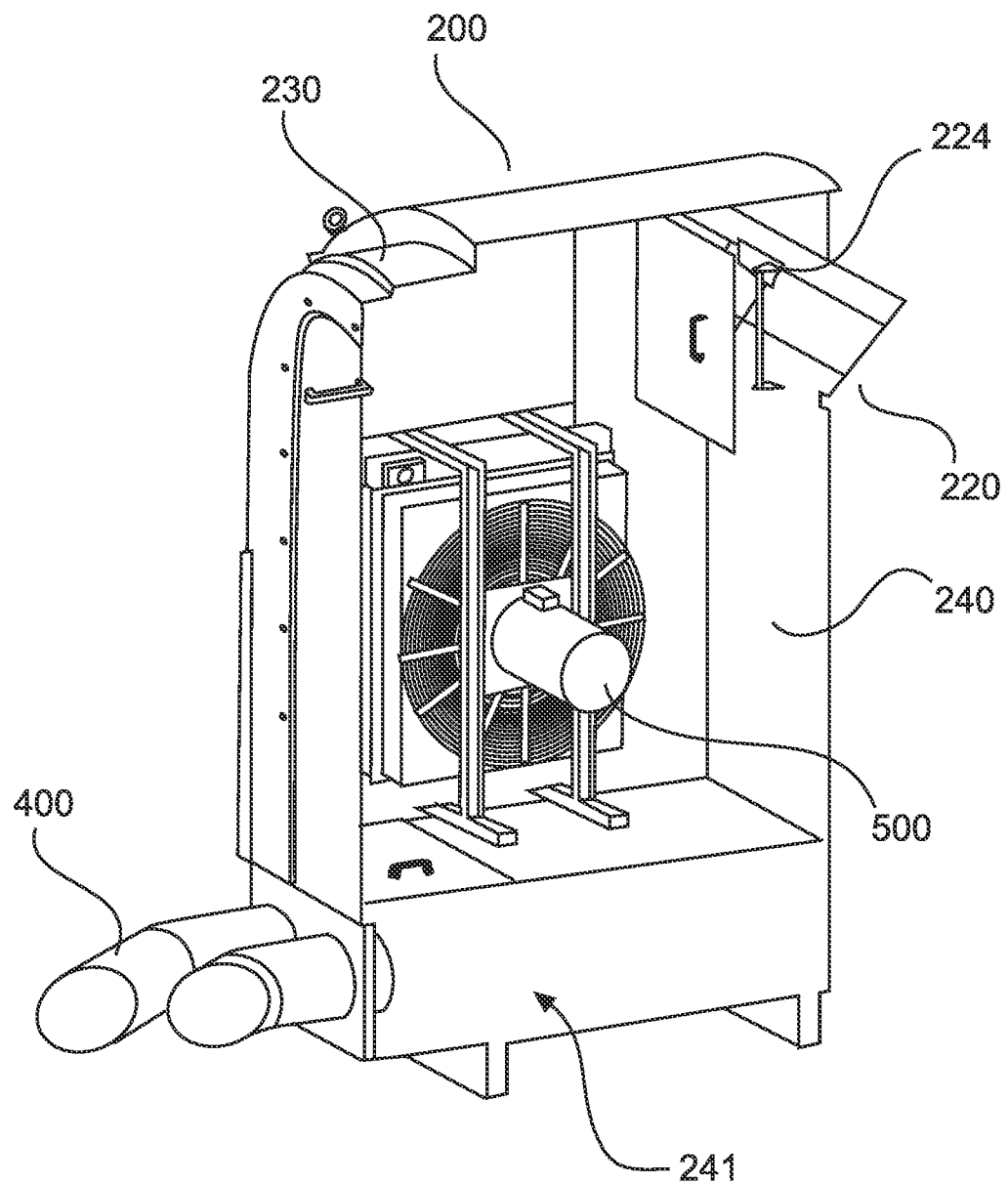

FIG. 4 shows a schematic sectional view of a cooling unit according to the second exemplary embodiment. A pressure-release unit 220 with a spring 224 and an opening limiter 223 is provided on the first section or the first end 210. A re-cooler or a heat exchanger 500 is provided in the interior 240 of the second cooling unit 200. The re-cooler or the heat exchanger 500 is in particular placed behind the protective grid 211 as a burglar-proof protective grid. In the lower region of the second cooling unit 200 the fault arc duct 400 can open into a separate volume 241. From this separate volume 241 a duct to the pressure-release unit can be provided so that a pressure wave formed in the medium-voltage switchgear assembly 600 can be led to the outside through the fault arc duct 400, the volume 241 and the pressure-release unit 220.

In order to improve protection from burglary or inhibition of burglary another protective grid can be provided behind the protective grid 211. The outer protective grid 211 can serves as a weather protective grid so that rain or precipitation can be prevented from penetrating into the second cooling unit 200.

The invention claimed is:

1. A wind turbine, comprising:
a foundation;
a tower having a tower wall;
at least one component inside an area surrounded by the tower wall;
a first cooling unit inside the area surrounded by the tower wall for cooling the at least one component;
a second cooling unit;
a medium-voltage switchgear assembly inside the area surrounded by the tower wall;
at least one fault arc duct between the medium-voltage switchgear assembly and the second cooling unit; and
at least one cooling conduit between the first and second cooling units,
wherein the second cooling unit includes:
a heat exchanger coupled to the at least one cooling conduit, and
a pressure-release unit operative to guide a pressure wave formed inside the medium-voltage switchgear assembly via the at least one fault arc duct to an outside of the second cooling unit, and
wherein the second cooling unit has a first end provided outside the tower wall and a second end provided at least partially inside the area surrounded by the tower wall.

2. The wind turbine according to claim 1, wherein the at least one fault arc duct opens into a separate volume inside the second cooling unit that is connected to the pressure-release unit and isolated from the heat exchanger.

3. The wind turbine according to claim 1, wherein:
the second cooling unit includes at least one protective grid configured to protect against burglary, and
the heat exchanger is arranged at least partially protected by the at least one protective grid.

4. The wind turbine according to claim 1, wherein cooling liquid flows in the at least one cooling conduit.

5. A cooling device for a wind turbine, comprising:
a first cooling unit positioned inside an area surrounded by a tower wall of a tower of the wind turbine; and
a second cooling unit, positioned at least partially outside the tower wall, the second cooling unit including:
a heat exchanger coupled to the first cooling unit via a cooling conduit, and
a connection for a fault arc duct, a pressure-release unit and a separate volume that is isolated from the heat exchanger,
wherein the connection for the fault arc duct is coupled to the separate volume, and
wherein the fault arc duct opens into the separate volume inside the second cooling unit, which is connected to the pressure-release unit.

6. The cooling device according to claim 5, wherein the wind turbine includes:
a foundation;
at least one component inside the area surrounded by the tower wall; and
a medium-voltage switchgear assembly inside the area surrounded by the tower wall, wherein the second cooling unit has a first end provided outside the tower wall and a second end provided at least partially inside the area surrounded by tower wall.

7. The cooling device according to claim 5, wherein:
the second cooling unit includes at least one protective grid configured to protect against burglary, and
the heat exchanger is arranged at least partially protected by the at least one protective grid.

8. The cooling device according to claim 5, wherein cooling liquid flows in the cooling conduit.

9. A wind turbine, comprising:
a rotor having a plurality of rotor blades;
a tower having a tower wall;
at least one component inside an area surrounded by the tower wall;
a first cooling unit inside the area surrounded by within the tower wall for cooling the at least one component;
a second cooling unit provided at least partially outside the tower wall;
a medium-voltage switchgear assembly inside the area surrounded by the tower wall;
at least one fault arc duct between the medium-voltage switchgear assembly and the second cooling unit; and
at least one cooling conduit between the first and second cooling units,
wherein the second cooling unit includes:
a heat exchanger, coupled to the at least one cooling conduit, and
a pressure-release unit operative to guide a pressure wave formed inside the medium-voltage switchgear assembly via the at least one fault arc duct to an outside of the second cooling unit, and wherein the second cooling unit has a first end provided outside the tower wall and a second end provided at least partially inside the area surrounded by the tower wall.

10. The wind turbine according to claim 9, wherein the at least one fault arc duct opens into a separate volume inside the second cooling unit, wherein the separate volume is isolated from the heat exchanger and is connected to the pressure-release unit.

11. The wind turbine according to claim 9, wherein
the second cooling unit includes at least one protective grid configured to protect against burglary, and
wherein the heat exchanger is arranged at least partially protected by the at least one protective grid.

12. The wind turbine according to claim 9, wherein cooling liquid flows in the at least one cooling conduit.

* * * * *

UNITED STATES PATENT AND TRADEMARK OFFICE
CERTIFICATE OF CORRECTION

PATENT NO. : 11,002,253 B2  Page 1 of 1
APPLICATION NO. : 16/066273
DATED : May 11, 2021
INVENTOR(S) : Konitz It is certified that error appears in the above-identified patent and that said Letters Patent is hereby corrected as shown below:

In the Claims

<u>In Column 6, Claim 9, Lines 6-7:</u>
"surrounded by within the tower wall"
Should read:
-- surrounded by the tower wall --.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*